Oct. 7, 1952  A. G. WILSON ET AL  2,612,792
EPICYCLIC GEAR
Filed Jan. 26, 1949  4 Sheets-Sheet 1

Inventors
A. G. Wilson
A. A. Miller
By Glascock Downing Seboll
Attys.

Inventors
A. G. Wilson
A. A. Miller

Oct. 7, 1952 A. G. WILSON ET AL 2,612,792
EPICYCLIC GEAR
Filed Jan. 26, 1949 4 Sheets-Sheet 3

Inventors
A. G. Wilson
A. A. Miller
By Stevens Downing Reebold
Attys.

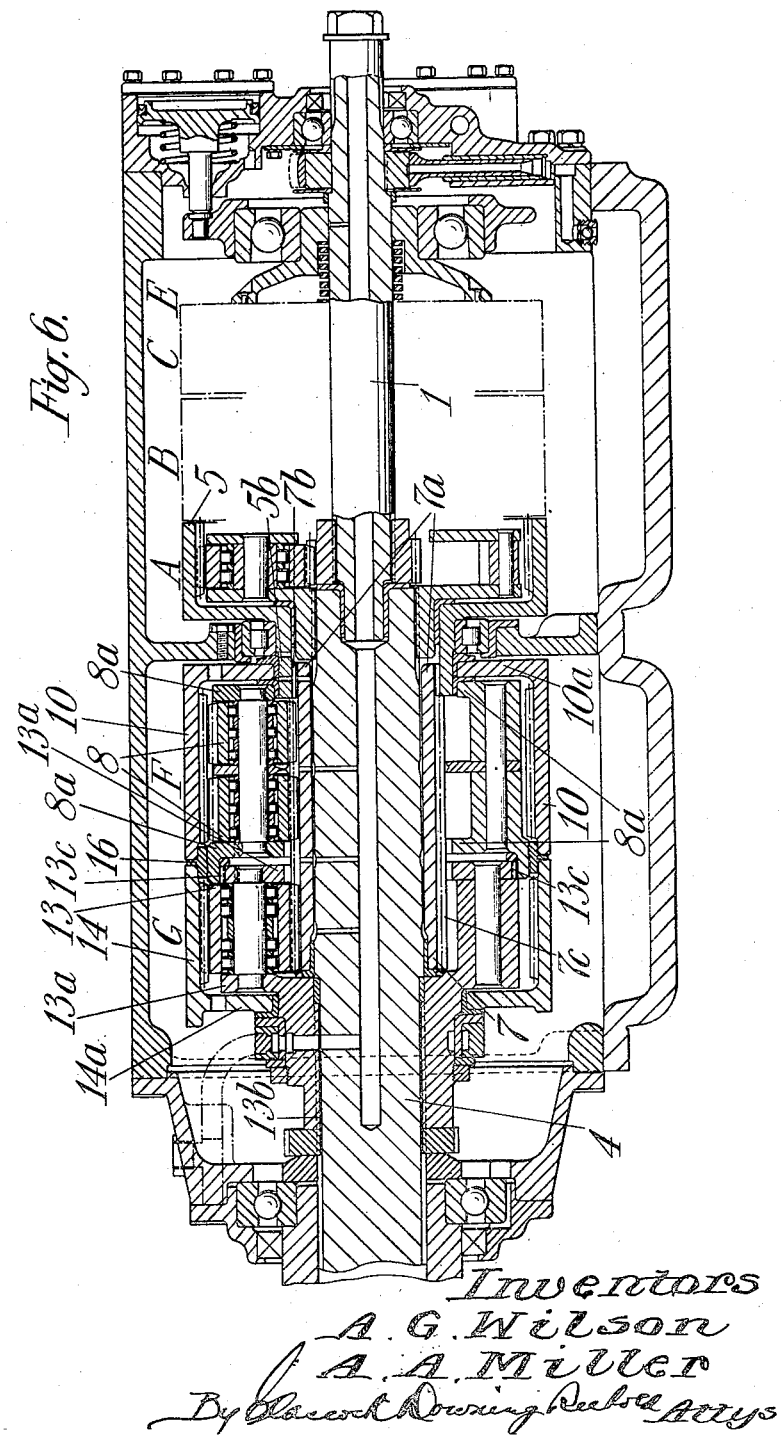

Patented Oct. 7, 1952

2,612,792

UNITED STATES PATENT OFFICE 2,612,792

EPICYCLIC GEAR

Andrew Gordon Wilson and Albert A. Miller, Coventry, England, assignors to Self-Changing Gear Company Limited, Coventry, England Application January 26, 1949, Serial No. 72,906
In Great Britain January 28, 1948

16 Claims. (Cl. 74—759)

1

This invention relates to epicyclic change speed gear units comprising sun, planet and toothed annulus gear elements, and in particular to compounded epicyclic gears, and has for its object the provision of an improved two-speed gear unit suitable for affording low-speed ratios or affording a supplemental or emergency low-speed gear in conjunction with multi-speed compounded epicyclic gears of known type.

The invention consists in a two-speed epicyclic gear comprising a first speed train having a sun wheel on the input shaft, planetary pinions carried by a cage on the output shaft and a controllable reaction annulus, compounded with a second speed train comprising a sun wheel, a controllable reaction annulus and a planet cage carrying planetary units each of which includes a pair of intermeshed planet pinions, one of which engages the annulus and the other the sun wheel, the arrangement being such that the planet cage and annulus of the first speed train are rotationally connected with the sun and the planet cage of the second speed train respectively, or vice versa.

The term "rotationally connected" as used herein is intended to include the case where one part is integral with another or the case where the parts are positively coupled (such as by splines), so that the connected elements rotate as one.

The gear according to the invention may be combined with a multi-speed compounded epicyclic gear of known type wherein the first speed of such multi-speed gear is adopted for the first speed of the two-speed gear as specified in the preceding paragraph. Furthermore, the improved gear unit may be coupled with a further epicyclic train to provide a reverse drive.

In the accompanying drawings:

Figure 1 is a longitudinal half-sectional diagram illustrating one form of two-speed gear unit according to the invention, while Figure 2 is a diagrammatic cross-section on the line 2—2 of Figure 1 looking in the direction of the arrow.

Figure 3 is a diagrammatic longitudinal half-section of a modified form of the improved two-speed gear unit, and Figure 4 is a diagrammatic longitudinal section illustrating the addition of a reverse train to the unit seen in Figure 3.

Figure 1:
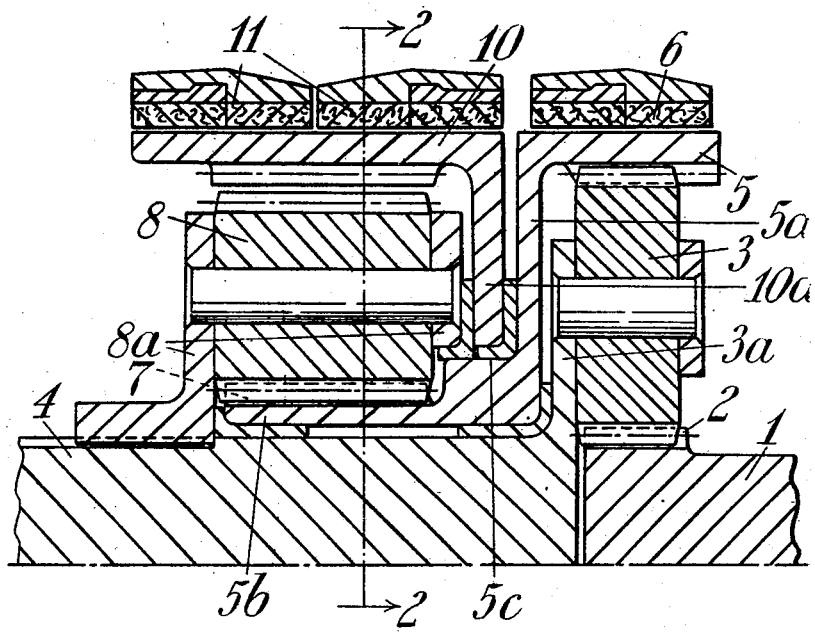
Figures 1, 2, 3 and 4 are diagrammatic views illustrating the arrangement of two forms (including a reverse gear in Figure 4) of gear units according to the invention.
Figure 5:
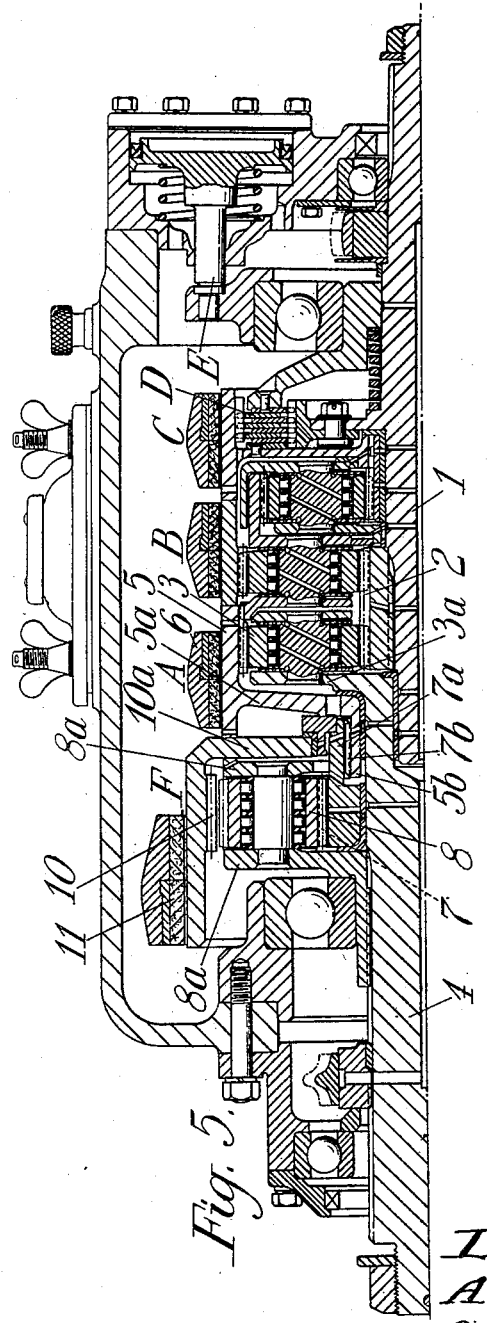

Figure 5 is a longitudinal half-section showing the construction of a four-speed gear box embodying the form of the invention diagrammatically illustrated in Figure 1 to provide a supplementary or emergency low gear, and Figure 6 is a longitudinal section of a corresponding four-speed gear box (according to the form of Figure 1) illustrating the addition of a reverse train to the emergency low train exemplified in Figure 5.

In carrying the invention into effect according to one mode, as applied to the production of a simple two-speed unit (see Figure 1), an input shaft 1 has a sun wheel 2 meshing with planet pinions 3 carried by a cage 3a mounted on the output shaft 4. A toothed annulus 5 is carried by a disc member 5a provided with a sleeve extension 5b rotationally mounted on the output shaft. The outer surface of the annulus 5 is formed as a brake drum and the annulus is controlled by a band brake 6 engageable with the drum surface. The sun wheel 2, planets 3 and annulus 5 constitute the elements for one speed train (referred to above as the first speed) train.

Figure 2:
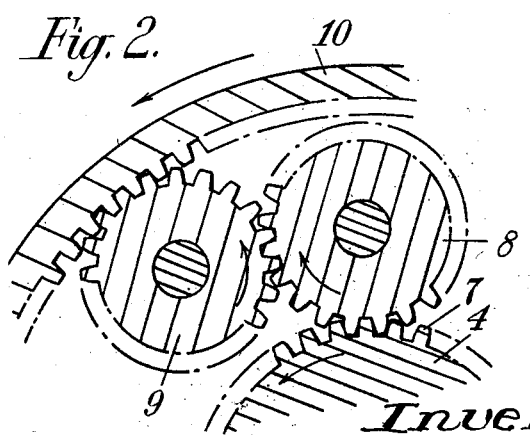

The extension sleeve 5b bears the sun wheel 7 of the second (lower) speed train and this sun wheel meshes with the inner planet gears 8 of a set of pairs of intermeshed planetary gears 8 and 9 (see Figure 2) of known type, the outer ones 9 of which mesh with the annulus 10 having a disc flange 10a rotationally mounted on a shoulder 5c of the sleeve 5b. The annulus 10 has an external brake drum surface engageable by twin controlling band brakes 11. The pairs of intermeshed planets 8 and 9 are mounted in a cage 8a keyed on the output shaft 4 and rotationally supported on its inward side on the shoulder 5c.

According to a modified form (see Figure 3) of the two-speed gear unit described above, the sun wheel 7 of the second or lower speed train is on the output shaft 4 instead of on the sleeve 5b of the annulus of the first train and the pairs of planets 8 and 9 are carried in a cage comprising the disc 5a of the annulus 5, and the ring element 5c which is rotationally supported on the output shaft. The annulus 10 of the second train has its disc flange 10a rotationally supported on the output shaft 4. The rotational supports for parts 5a, 10a are omitted from the diagram.

Figure 3:
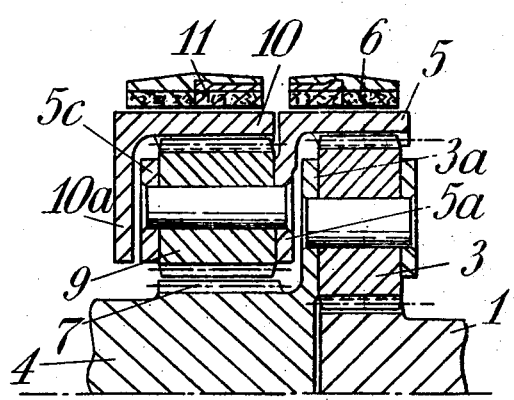
Figure 4:
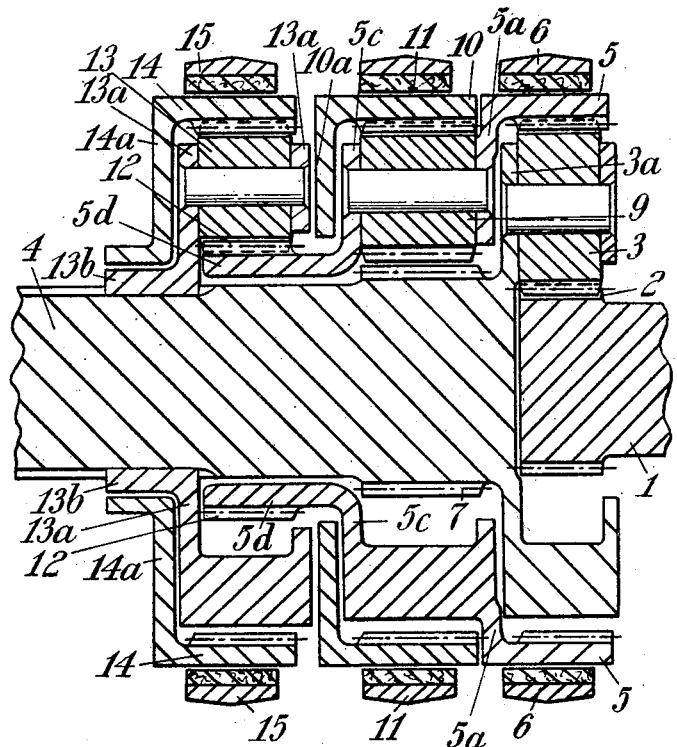

With both forms of two-speed unit described above, a reverse gear train may be combined. Figure 4 illustrates a reverse gear train added to a unit as shown in Figure 3. The reverse train for a unit illustrated in Figure 1 is shown in combination with the elements of that unit as applied to the multi-speed compounded epicyclic gear described below with reference to Figure 5.

In Figure 4 the cage part 5c has a sleeve extension 5d on which the sun 12 of the reverse gear is mounted. The planets 13 of the reverse gear are carried on the cage 13a, the sleeve 13b of which is keyed on the output shaft 4. The reverse annulus is indicated at 14, the disc flange 14a of which is rotationally mounted on the sleeve 13b. The outer surface of the annulus is formed as a brake drum controlled by a band brake 15.

The invention will be further described with reference to the application thereof to and in combination with a four-speed compounded epicyclic gear of known type to afford an emergency or supplementary low gear. Referring to Figure 5 this multi-speed gear comprises a first speed epicyclic train A the sun of which is keyed or formed upon the input shaft 1 and the planet cage is fixed upon the coaxial output shaft while the annulus has a radial web and sleeve rotationally supported on said output shaft, the exterior of the annulus being formed as a brake drum adapted to co-operate with a suitable band brake or control element.

The second speed elements B are arranged adjacent the first speed and the sun wheel of this second speed train is also keyed or formed on the input shaft. The planet cage is rotationally supported from the input shaft and is operatively connected with the annulus of the first gear by having the periphery of its adjacent cheek formed with teeth meshing with those of the annulus of the first gear.

The annulus of the second gear is in one with the cage of the planets of the third gear C which is suitably rotationally supported upon a plate clutch member referred to hereinafter and the annulus for which is integral with the adjacent cheek of the planet cage of the second gear. The annulus of the second gear has an exterior brake drum surface controlled by a band brake but the annulus of the third gear is controlled only by its integral connection with the planet cage of the second gear.

The fourth speed is an en bloc drive through a plate clutch D, the inner plates of which are mounted upon a suitable hub on the input shaft. The outer clutch plates are carried internally of a drum having an exterior surface engageable by a controlling band brake. This clutch drum is extended in web form inwardly and has a sleeve rotationally supported on the input shaft and forms the member (referred to above) on which the planet cage of the second speed and annulus of the third speed are rotationally supported. The sleeve is formed with sun wheel teeth for the third speed. To the right-hand side of Figure 5 at E hydraulic piston mechanism of known kind and associated parts for operating the displaceable plates of the clutch D, are illustrated.

In carrying the invention into effect as applied to the four-speed compounded gear as above described, the first speed gear of that arrangement is adopted as the first speed train in adding the emergency low by combining a unit as described according to Figure 1 with the said four-speed gear and the same reference numerals are employed in Figure 5 as in Figure 1 to denote corresponding parts. The sleeve 5b of the annulus 5 (of the train A) is rotationally supported upon the output shaft 4 and is rotatably connected to the sun wheel 7 of the emergency low speed train F of the combination. For constructional reasons the sun wheel member 7 is a separate part from the sleeve 5b. The member 7 is formed with a sleeve extension 7a which is slid over the sleeve 5b, the two sleeves being formed with engaging splines or teeth 7b such that the sun wheel 7 is operatively coupled to the annulus 5. This sun 7 is meshed with planet pinion units in cage 8a keyed to the output shaft. The planet cage carries an appropriate series of pairs of planetary pinions 8 and 9 each unit of which comprises the planet pinion 8 meshed with the sun wheel 7 and meshed with the second planet pinion 9 meshing with the annulus 10 of the emergency low speed gear F (after the manner already described in reference to Figure 2). This annulus is formed with a brake drum controlled by band brake 11 and is conveniently rotationally supported upon the sleeve of the annulus 5 of the first speed of both the four-speed compounded gear and the added gear or, as shown in Figure 5, the annulus 10 is supported on a ring fitting mounted on the sleeve 7a which virtually forms part of the sleeve 5b.

For extending the gear shown in Figure 5 to afford a reverse drive, the sun wheel of the emergency gear formed on the sleeve of the annulus of the first speed gear is elongated or two sets of sun wheel teeth may be provided on this sleeve, one for the emergency train and the other for the reverse drive. A planet cage for the reverse gear is keyed on the output shaft and is coupled with the planetary cage of the emergency gear.

Figure 6 illustrates the provision of a reverse gear in a four-speed gear box having an emergency low. The arrangement shown in this figure is equivalent to that illustrated in Figure 5 with regard to the trains A, B, C and F, differing only in constructional modifications and the omission of certain obvious accessories such, for instance, as the band brakes.

In Figure 6 the sun wheel member 7 is coupled by splines 7b to sleeve 5b of the annulus of train A and is extended longitudinally to provide sun teeth 7c for the emergency low train F and the reverse train G. In this instance the planet pinions 8, 9 are each exemplified as double pinions and their cage 8a is rotationally supported at its periphery in a ring member 16 positioned between the annulus 10 of the train F and the annulus 14 of the train G. The planets 13 of the reverse train G are mounted in cage 13a keyed on the output shaft 4 at 13b and the inward ring of said cage is rotationally in one with the cage of train F by means of a toothed coupling with annular teeth on the adjacent cage member 8a, as at 13c. The annulus of the reverse gear G is designated 14 and the part 14a of such is rotationally supported on the sleeve extension 13b of the cage 13a as in the case of the reverse gear depicted in Figure 4.

In Figure 6 the annuli of gears A and of trains F and G are formed externally as drums and are controlled by band brakes (not shown) after the manner illustrated in Figure 5.

The reverse gear for the modified emergency gear of Figure 3 has already been described above with reference to Figure 4.

In combining a gear unit according to the modification shown in Figure 3, with a four-speed compounded epicyclic gear as referred to in Figure 5, no separate drawing is required to illustrate such arrangement as reference to the two Figures 3 and 5 with the following description will make the combination clear. The annulus 5 of the train A, instead of being rotationally connected with the sun wheel of the emergency low train, is integral with or rotationally connected to the cage carrying intermeshed planets (as 8 and 9) and the sun wheel 7 is on the output shaft 4 on which the annulus (as 10 and disc member 10a, Figure 3) of the emergency low train is rotationally supported.

In order to add a reverse gear to the combination described in the preceding paragraph, an arrangement as illustrated in Figure 4 is employed. Thus the sun wheel of the reverse train will be rotationally supported on the output shaft 4 and rotationally connected with the planet cage of the emergency low gear and the annulus of a train A, while the planets (as 13 of Figure 4) are in a cage keyed on the output shaft with the annulus (as 14) rotationally supported over a sleeve, such as 13b on the output shaft.

We claim:
1. An epicyclic two-speed gear unit for affording an exceptionally low forward speed ratio or an emergency low gear, including a first speed train having a sun wheel on the input shaft, planetary pinions carried by a cage on the output shaft, and a controllable reaction annulus, said train being compounded with a second and lower speed forward train comprising three elements namely, a controllable reaction annulus, a sun wheel, and a planet cage carrying planetary units each of which includes a pair of intermeshed planet pinions, the arrangement being such that one of the latter two elements is rotationally connected to the reaction annulus of the first speed train and the other element is rotationally connected to the planet cage of the first speed train.

2. An epicyclic gear unit as claimed in claim 1 wherein the sun wheel of the said second speed train is rotationally connected to said first speed train annulus which latter is rotatably mounted over the output shaft.

3. An epicyclic gear unit as claimed in claim 1 wherein the sun wheel of the said second speed train is rotationally connected to said first speed train annulus which latter is rotatably mounted on the output shaft, and the planet cage of the second speed train is keyed on the output shaft and the second speed train annulus is rotatably mounted on a sleeve which latter is rotationally connected with the first speed train annulus and with the sun wheel of the second speed train.

4. An epicyclic gear unit as claimed in claim 1 wherein the sun wheel of the second speed train is rotationally connected to the planet cage of the first speed train and the planet cage of the second speed train is rotationally connected with the annulus of the first speed train and is also rotatably mounted over the output shaft.

5. An epicyclic gear unit as claimed in claim 1 wherein the sun wheel of the second speed train is rotationally connected to the planet cage of the first speed train and the planet cage of the second speed train is rotationally connected with the annulus of the first speed train and is also rotatably mounted over the output shaft, and the annulus of the second speed train is also mounted over the output shaft.

6. An epicyclic two speed and reverse gear having a gear unit as claimed in claim 1 wherein the sun wheel of the said second speed train is rotationally connected to the planet cage of said first speed train and the annulus of the latter is rotatably connected to the planet cage of the second speed train, and including a third train for affording a reverse comprising a sun wheel rotationally connected to the annulus of the first train, planets, a planet cage keyed on the output shaft and rotationally connected to the planet cage of the first train, a reaction annulus rotatably mounted on the output shaft, and control means for said reaction annulus.

7. An epicyclic two-speed and reverse gear having a gear unit as claimed in claim 1 wherein the sun wheel of the second speed train is rotationally connected to the planet cage of the first speed train and the planet cage of the second speed train is rotationally connected with the annulus of the first speed train and is also rotatably mounted over the output shaft, and including a third train for affording a reverse comprising a sun wheel rotationally connected to the planet cage of the second speed train, planets, a planet cage keyed on the output shaft, a reaction annulus rotatably mounted on the output shaft, and control means for said reaction annulus.

8. A multi-speed compounded epicyclic gear including a first speed gear unit comprising a sun wheel on the input shaft, planets, a planet cage on the output shaft, and a controlled reaction annulus rotatably mounted on the output shaft, and an emergency low gear unit affording an exceptionally low speed forward ratio combined with said first speed gear unit and comprising a sun wheel rotationally connected with the annulus of the first speed gear unit, a controlled annulus rotatably mounted over the output shaft, a planet cage in driving connection with the output shaft and carrying planetary pinion units each of which includes a pair of intermeshed planet pinions, one of said pinions engaging the low gear unit annulus and the other of said pinions engaging the low gear unit sun wheel.

9. A multi-speed compounded epicyclic gear including a first speed gear unit comprising a sun wheel on the input shaft, planets, a planet cage on the output shaft, and a controlled reaction annulus rotatably mounted on the output shaft, an emergency low gear unit affording an exceptionally low speed forward ratio combined with said first speed gear unit and comprising a sun wheel rotationally connected with the annulus of the first speed gear, a controlled annulus rotatably mounted over the output shaft, a planet cage in driving connection with the output shaft and carrying planetary pinion units each of which includes a pair of intermeshed planet pinions, one of said pinions engaging the low gear unit annulus and the other of said pinions engaging the low gear unit sun wheel, and including a reverse gear train comprising a sun wheel rotationally connected with the sun wheel of the emergency low train, planets, a planet cage included in the driving connection of the planet cage of the emergency low gear unit, and a controlled annulus rotatably mounted over the output shaft.

10. In a multi-speed compounded epicyclic gear, having a first speed gear comprising a sun wheel on the input shaft, planets, a planet cage on the output shaft and a controllable reaction annulus rotatably mounted on the output shaft, the provision of a supplementary and exceptionally low gear combined with said first speed gear and comprising a sun wheel on the output shaft and rotationally connected with the planet cage of said first speed gear, intermeshed planet pinion pairs and planet cage rotationally connected with the annulus of the first speed gear and rotatably mounted over the output shaft over which is also rotatably mounted the controllable annulus of the said supplementary low gear.

11. In a multi-speed compounded epicyclic gear as claimed in claim 10, the provision of a reverse gear train comprising a sun wheel mounted in driving relation with the output shaft and in driving relation with the planet cage of the said supplementary low gear and with the reaction annulus of said first speed gear, planets in a planet cage also in driving relation with the output shaft, and a controllable reaction annulus rotatably mounted over the output shaft.

12. A compounded epicyclic gear for affording an exceptionally low forward speed ratio or an emergency low forward gear, including a first speed train having a sun wheel on the input shaft, planetary pinions carried by a cage on the output shaft, and a controllable reaction annulus, and a second and lower speed forward train comprising three elements, namely a controllable reaction annulus, a sun wheel, and a planet cage carrying planetary units each of which includes a pair of intermeshed planet pinions, the arrangement being such that one of the latter two elements is rotationally connected to the reaction annulus of the first speed train and the other element is rotationally connected to the planet cage of the first speed train.

13. A compounded epicyclic gear according to claim 12, wherein the sun wheel of the said second speed train is rotationally connected to said first speed train annulus which latter is rotationally mounted over the output shaft.

14. A compounded epicyclic gear according to claim 12, wherein the sun wheel of said second speed train is rotationally connected to said first speed train annulus which latter is rotatably mounted on the output shaft, and the planet cage of the second speed train is keyed on the output shaft and the second speed train annulus is rotatably mounted on a sleeve which latter is rotationally connected with the first speed train annulus and with the sun wheel of the second speed train.

15. A compounded epicyclic gear according to claim 12, wherein the sun wheel of the second speed train is rotationally connected to the planet cage of the first speed train and the planet cage of the second speed train is rotationally connected with the annulus of the first speed train and is also rotatably mounted over the output shaft.

16. A compounded epicyclic gear according to claim 12, wherein the sun wheel of the second speed train is rotationally connected to the planet cage of the first speed train and the planet cage of the second speed train is rotationally connected with the annulus of the first speed train and is also rotatably mounted over the output shaft, and the annulus of the second speed train is also mounted over the output shaft.

A. GORDON WILSON.
A. A. MILLER.

REFERENCES CITED

The following references are of record in the file of this patent:

UNITED STATES PATENTS

| Number | Name | Date |
|---|---|---|
| 1,132,390 | Royce | Mar. 16, 1915 |
| 1,404,675 | Wilson | Jan. 24, 1922 |
| 1,694,295 | Tuttle | Dec. 4, 1928 |
| 1,796,904 | Wilson | Mar. 7, 1931 |
| 2,135,246 | Yoxall | Nov. 1, 1938 |
| 2,329,724 | Mauer | Sept. 21, 1943 |
| 2,459,793 | Churchill | Jan. 25, 1949 |

FOREIGN PATENTS

| Number | Country | Date |
|---|---|---|
| 5,024 | Great Britain | Feb. 24, 1897 |
| 27,757 | Great Britain | Nov. 12, 1908 |